(12) United States Patent
Lechner

(10) Patent No.: US 7,131,265 B2
(45) Date of Patent: Nov. 7, 2006

(54) MOTOR VEHICLE WITH A CRYOTANK

(75) Inventor: Werner Lechner, Taufkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 188 days.

(21) Appl. No.: 10/849,033

(22) Filed: May 20, 2004

(65) Prior Publication Data

US 2006/0218900 A1    Oct. 5, 2006

Related U.S. Application Data

(63) Continuation of application No. PCT/EP02/13652, filed on Dec. 3, 2002.

(30) Foreign Application Priority Data

Jan. 22, 2002   (DE) ................. 102 02 171

(51) Int. Cl.
   *F01N 3/00*   (2006.01)
(52) U.S. Cl. ............... 60/286; 60/274; 60/283; 60/295; 60/303
(58) Field of Classification Search ........... 60/274, 60/283, 286, 295, 300, 303
   See application file for complete search history.

(56) References Cited

U.S. PATENT DOCUMENTS 5,272,873 A * 12/1993 Hamazaki .............. 60/283
5,353,590 A * 10/1994 Pettit et al. .............. 60/274
5,544,483 A *  8/1996 Heuer .................... 60/283
5,806,304 A *  9/1998 Price et al. .............. 60/274
6,122,908 A *  9/2000 Wirmark ................ 60/274
6,250,073 B1*  6/2001 Zimmer et al. .......... 60/281
6,898,929 B1*  5/2005 Asmus et al. ............ 60/286

FOREIGN PATENT DOCUMENTS

| | | |
|---|---|---|
| DE | 41 03 668 | 8/1992 |
| DE | 199 44 388 | 3/2001 |
| EP | 0 537 968 | 4/1993 |
| EP | 0 745 499 | 12/1996 |
| EP | 1 057 998 | 12/2000 |
| GB | 2 303 668 | 2/1997 |
| JP | 02 086915 | 3/1990 |
| JP | 03 242415 | 10/1991 |

OTHER PUBLICATIONS

International Search Report.

* cited by examiner

*Primary Examiner*—Binh Q. Tran
(74) *Attorney, Agent, or Firm*—Crowell & Moring LLP

(57) ABSTRACT

A motor vehicle, which has a cryotank for supplying an internal combustion engine, includes an exhaust gas system including an exhaust gas catalyzer, a device for the combustion of boil-off gas from the cryotank, a gas duct, and a nozzle. The nozzle is configured to introduce the boil-off gas in the manner of an ejector pump into the gas duct which draws at least one of environmental air and scavenging air from a fuel supply system. The gas duct discharges near the exhaust gas catalyzer into the exhaust gas system.

15 Claims, 2 Drawing Sheets

MOTOR VEHICLE WITH A CRYOTANK

CROSS REFERENCE TO RELATED APPLICATIONS

This application is a continuation of international patent application no. PCT/EP02/13652, filed Dec. 3, 2002, designating the United States of America, and published in German as WO 03/062005, the entire disclosure of which is incorporated herein by reference. Priority is claimed based on German patent application no. 102 02 171.6, filed Jan. 22, 2002.

The invention relates to a motor vehicle with a cryotank for supplying an internal combustion engine of a motor vehicle. The motor vehicle has an exhaust gas apparatus with an exhaust gas catalyst, and an apparatus for the combustion of boil-off gas from the cryotank. The technical background is provided in, for example, DE 195 33 863 A1 and EP 0 745 499 B1.

Fuels, that are extremely promising for the future for the propulsion of motor vehicles, such as hydrogen or natural gas or the like, can be liquefied relatively easily and stored at a very low temperature. In this cryogenic fuel storage, however, due to the entry of heat into the fuel tank, a small amount of liquid fuel evaporates virtually constantly in the tank, forming the so-called "boil-off gas." When no machine consuming the fuel is in operation, i.e., when the internal combustion engine is not running, the internal pressure in the tank rises as a result. For reasons of safety, this pressure must be limited by opening a valve. In general, the boil-off gas is emitted to the environment through a relief line in which the valve is provided. European Patent 0 745 499 B1, referred to above, discloses a method involving interim storage of the boil-off gases and catalytic oxidation of liquid petroleum gas as cryogenic fuel. It is also described in DE 195 33 863 A1 that so-called excess gas, which has to be blown off if a pressure limit is exceeded in a fuel tank for LPG or LNG, for example, can be burned in a catalytic heating apparatus placed in the exhaust system of a motor vehicle.

Basically, the burning of the boil-off gas, including its catalytic oxidation, is better than the mere discharge of the (combustible) boil-off gas into the environment. If the boil-off gases are burned, especially in a catalyst or in some other appropriate device, not only does this increase the safety of operation of the vehicle, but can also at least slightly improve its energy balance, if at least some of the energy or heat, especially by the combustion or oxidation of the boil-off gas, can at least partially be utilized.

An object of the present invention is to improve upon the above-discussed prior art.

To achieve the object, the boil-off gas is introduced into a gas line through a nozzle in the manner of an ejector pump, which draws ambient air and/or scavenging air out of the fuel supply system of the motor vehicle. Additionally, the gas duct discharges near an exhaust gas catalyst into the internal combustion engine's exhaust system. The boil-off gas can be introduced in the unburned or burned state into the engine's exhaust system in the same flow direction as the engine exhaust gas.

Thus at least a portion of the heat released by the burning or oxidation of the boil-off gas is delivered to the exhaust system of the engine, in which case an exhaust catalyst in the exhaust system, i.e., a converter for harmful exhaust components, can benefit from this supply of energy. Such an exhaust catalyst must have a certain minimum temperature before it can successfully treat the relatively great exhaust gas flow of the internal combustion engine, i.e., can convert the important pollutants contained therein.

Now, if an exhaust catalyst of the vehicle's internal combustion engine is reheated from time to time during a period of idling of the motor vehicle by the oxidation of boil-off gas or by the heat contained in the oxidized boil-off gas, the exhaust catalyst can be warmed before the engine is started and is thus ready to run. In that case, the desired occasional heating of the engine's exhaust gas catalyst can be performed by the burned or oxidized boil-off gas stream in various ways. Thus, the boil-off gas can be burned in an independent burning device, and the warm or hot gas stream emitting from this device can be introduced into the engine's exhaust system close to the engine's exhaust gas catalyst, so that at least a portion of the heat contained in the gas stream is transferred to the exhaust catalyst. This can be done either by heat radiation or conduction or by convection, and can be especially or particularly efficient when the gas stream is passed through the exhaust gas catalyst itself. Then the combustion device for the boil-off gases can, in turn, operate on a catalytic basis, i.e., can also be configured in the form of a catalyst, or also alternatively operate with its own flame.

Alternatively, the engine's exhaust gas catalyst itself can form the boil-off gas combustion device, i.e., the boil-off gas is catalytically burned or oxidized in the exhaust gas catalyst of the internal combustion engine. In that case the exhaust gas catalyst is heated as desired, and an additional advantage is that no independent catalytic device is needed for the combustion of the boil-off gas. To achieve successful conversion or flame-less combustion, the boil-off gas can, if desired, be conducted through a portion of the exhaust catalyst in order to bring this portion more quickly to the necessary working temperature. Then what can be involved is a catalyst partial area considered in the direction of flow of the engine's exhaust or a partial area transversely across it, i.e., the boil-off gas sweeps over only a portion of the cross section of the exhaust catalyst.

If the boil-off gas is burned in an independent combustion device, the waste heat produced therein can be fed not only by the gas flow carried out of this combustion device, but also by heat conduction to the engine's exhaust system, and especially to the exhaust gas catalyzer provided therein. In the simplest case, for this purpose the so-called combustion device is suitably connected by thermal conduction to the engine's exhaust gas catalyzer.

The boil-off gas can be introduced through a nozzle in the manner of an ejector pump into a gas duct, which then draws ambient air and/or scavenging gas from the fuel supply system of the vehicle by the ejector pumping action. This gas duct can then open directly in the exhaust system of the internal combustion engine or first in a combustion device for the boil-off gas. The ejector pump-like configuration makes it possible for sufficient air or oxygen to be available in addition to the boil-off gas flow for the oxidation or burning of the boil-off gas, either in the separate combustion device or in the engine's exhaust gas catalyzer.

It is especially advantageous if, with the ejector pump action, the scavenging air is drawn or pumped from the fuel supply system of the motor vehicle. Such a scavenging air system is to be provided on a cryotank apparatus of a vehicle so as to prevent slight leakage of gaseous fuel from collecting in any kind of insulating covering or the like, and being able there to form an ignitable mixture. With appropriately delivered scavenging air, which now is pumped by the ejector pump principle from the boil-off gas appropriately entering from a nozzle into the gas line, these slight leaks are carried together with the boil-off gas into the combustion device and can be burned or auto-oxidized therein.

Advantageously, therefore, no separate pumping device is necessary for the scavenging gas supply. This advantage becomes evident especially if the gas duct leads into the exhaust gas system of the internal combustion engine such that, during the operation of the engine, gases are drawn from the gas duct into the exhaust gas system, namely from the exhaust gas of the internal combustion engine. Thus, even during the operation of the engine, during which usually no boil-off gas is produced, scavenging gas can be delivered. Then, too, it is assured that any leakage from the fuel supply system will be drawn off and treated appropriately in the combustion device and/or in the exhaust gas catalyzer. Disposal of possible leakage in the fuel supply system or in the cryotank system is thus assured, both when the engine is not running and when it is running.

Other objects, advantages and novel features of the present invention will become apparent from the following detailed description of the invention when considered in conjunction with the accompanying drawings.

DETAILED DESCRIPTION OF THE DRAWINGS

Figure 1:
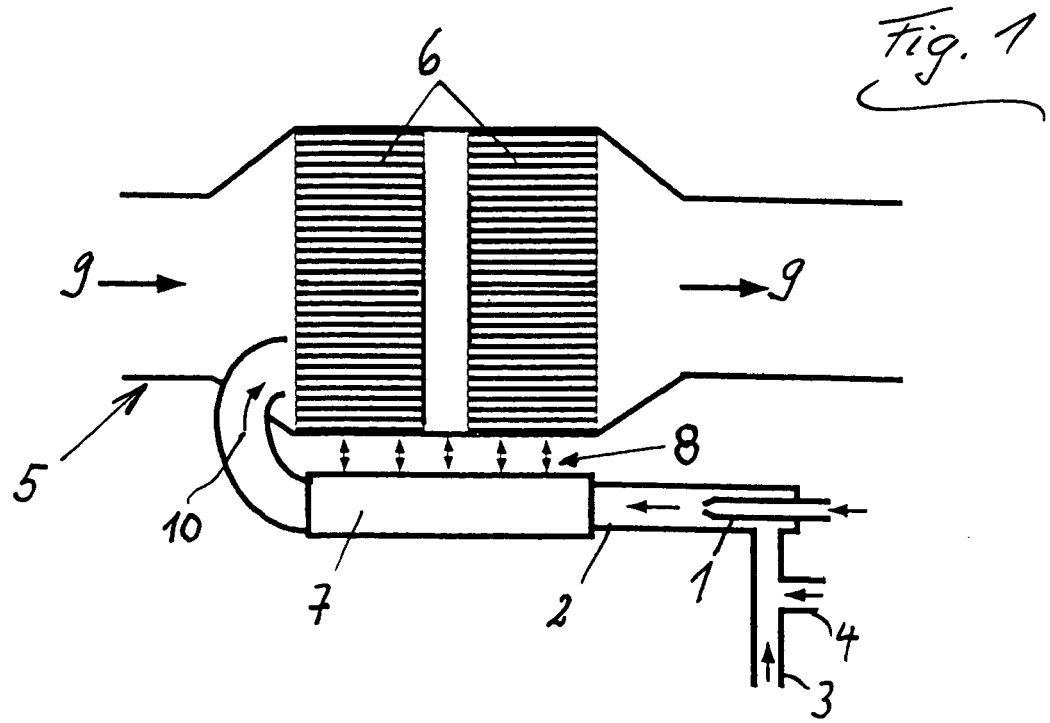
FIG. 1 shows a first embodiment with an independent combustion device or generally a so-called "utilizer" of the boil-off gas from a cryotank system in a motor vehicle.
Figure 2:
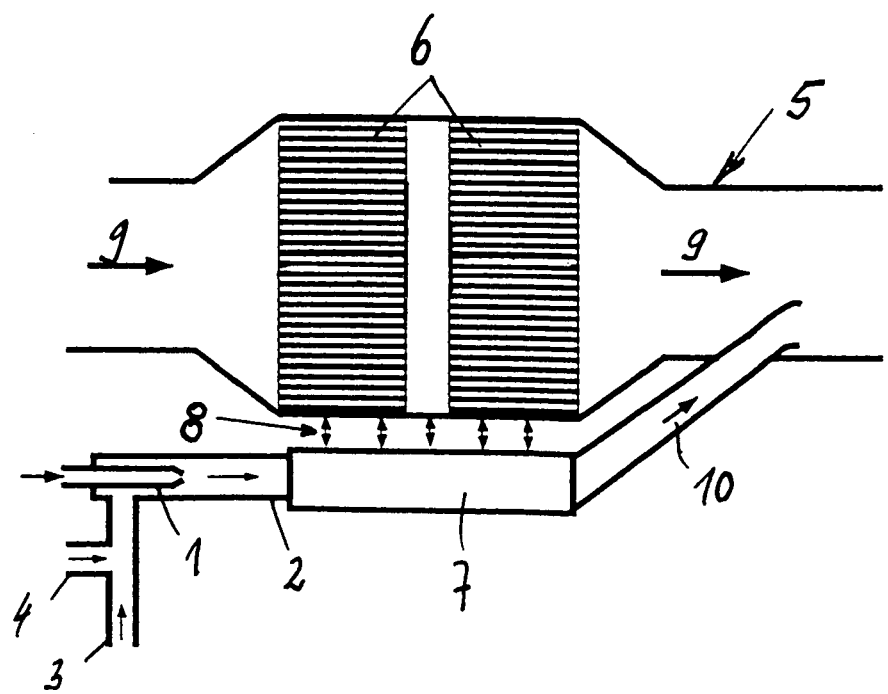
FIG. 2 shows a second embodiment with an independent combustion device or generally a so-called "utilizer" of the boil-off gas from a cryotank system in a motor vehicle.
Figure 3:
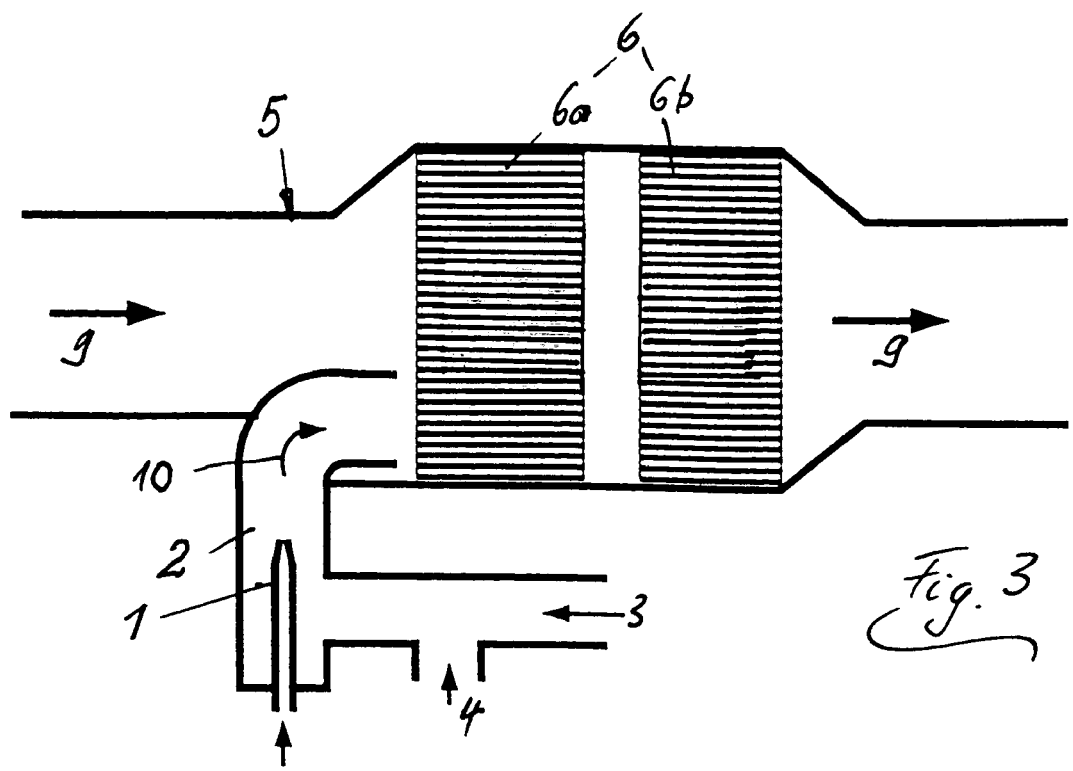
FIGS. 3 and 4 each illustrate an embodiment, in which the boil-off gas is converted or oxidized (thus "burned").
Figure 4:
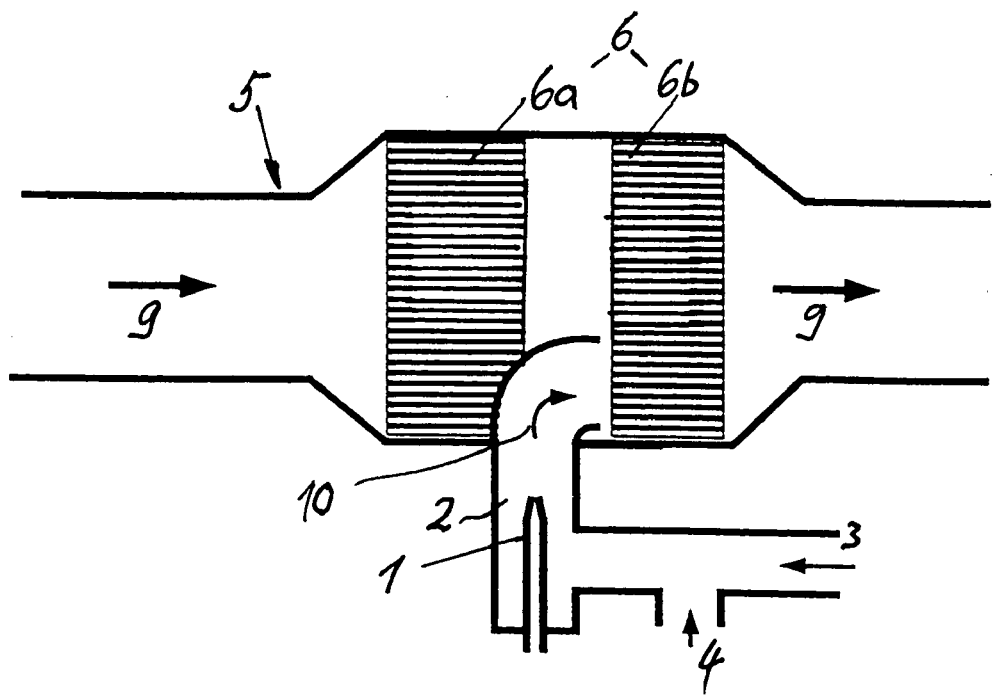

FIGS. 1 and 2 show, respectively, first and second embodiments with an independent combustion device or generally a so-called "utilizer" of the boil-off gas from a cryotank system in a motor vehicle, while in the embodiments in FIGS. 3 and 4, the boil-off gas is converted or oxidized (thus "burned"). In all figures the same elements are identified by the same reference numbers.

FIG. 1 illustrates a nozzle 1, from which boil-off gas from the cryotank system can be injected, under the control of appropriate valves, into a gas duct 2.

Relative to the gas duct 2, the nozzle 1 is arranged such that an ejector pump can be used to inject ambient air and scavenging air from the cryotank system into the gas duct 2. Finally, the gas duct discharges in the exhaust system 5 of the internal combustion engine upstream (as seen in the direction of flow of the exhaust gases 9 from the engine) from an exhaust gas catalyzer 6, as commonly provided, to convert harmful components of the exhaust gases 9 from the engine. This is shown in the embodiments in FIGS. 1 and 3.

In the embodiments in FIGS. 1 and 2, a combustion device 7 for the boil-off gas and for the gaseous fuel contained in the scavenging gas is provided between the nozzle 1 and the exhaust system 5. FIGS. 3 and 4 show no such combustion device. In the embodiments shown in FIGS. 3 and 4, the boil-off gas is burned or auto-oxidized in the exhaust catalyzer 6 itself. In FIG. 3 the boil-off gas flows through the entire support body of the exhaust gas catalyzer 6, coated with an appropriate catalyst. In FIG. 4 the boil-off gas is delivered only to the second catalyst-coated support body 6b, while the upstream, front support body for a catalyst 6a is not contacted by boil-off gas. The heat released in the rear support 6b can thus heat the rear support 6b intensely without heating the front support body 6a.

In the embodiments in FIGS. 1 and 2, the heat from the gas stream 10 from the combustion device 7 is used to heat the exhaust gas catalyzer 6. In FIG. 1 this gas stream passes through the exhaust gas catalyzer 6 with its catalytically coated support bodies 6, whereas in FIG. 2 essentially only the radiant heat from this gas stream 10 or the heat released from the wall of the exhaust system 5 heats the exhaust gas catalyzer 6, since in this embodiment the gas stream 10 from the combustion device 7 is introduced into the exhaust gas system 5 downstream from the exhaust gas catalyzer 6.

In the embodiments of FIGS. 1 and 2, the combustion device 7 is additionally in heat-conducting connection, represented by double arrows 8, with the exhaust catalyzer 6. Thus the exhaust gas catalyzer 6 can preheat the combustion device 7 and, if the combustion device 7 operates on a catalytic basis, prepare it for operation. This is especially significant in the case of bivalent motor vehicles, i.e., those which can operate with different fuels, if boil-off gases are produced during operation on gasoline or the like. Furthermore, in the embodiment shown in FIG. 1, any boil-off gas that is not oxidized in the combustion device 7 can be burned in the exhaust gas catalyzer 6 subsequently.

In the embodiments of FIGS. 1, 3 and 4 the reaction heat released in the combustion of the oil-off gas leads to the preheating of the exhaust gas catalyzer 6, so that in case of a cold start of the engine the catalyzer 6 can reach its working temperature more quickly, so that the engine's pollutant emissions are reduced. But also in the embodiment in FIG. 2 the exhaust gas catalyzer 6 is heated by the combustion of the boil-off gas. Thus, the system is capable of withdrawing the slight leakages that are virtually unavoidable in the cryotank system, both when the engine is off and during its operation, merely by the ejection pump principle, and eliminating them as described. For this purpose, therefore, no independent supply of energy (e.g., in the form of a separate fan) is necessary. Furthermore, by linking the boil-off utilizer and the combustion device 7 for the boil-off gas with the exhaust system 5 of the internal combustion engine, no additional exhaust pipe is needed for the combustion device 7 (or for the boil-off utilizer). It is pointed out that a number of details different from the above explanations can be arranged without departing from the content of the patent claims.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A motor vehicle with a cryotank for supplying an internal combustion engine driving the motor vehicle, with which an exhaust gas system having an exhaust gas catalyzer is associated, as well as a device for the combustion of boil-off gas from the cryotank,
   wherein the boil-off gas is introduced through a nozzle of an ejector pump into a gas duct which draws environmental air and/or scavenging air from the fuel supply system of a motor vehicle, and that the gas duct discharges near an exhaust gas catalyzer into the internal combustion engine's exhaust system.

2. The motor vehicle of claim 1, wherein the gas duct discharges into the exhaust system of the internal combustion engine such that during the operation of the internal combustion engine gases are drawn from the gas duct into the exhaust system.

3. The motor vehicle of claim 2, wherein the boil-off gas in the unburned or burned condition is introduced into the internal combustion engine's exhaust system upstream from the exhaust gas catalyzer or into same.

4. The motor vehicle of claim 2, wherein the boil-off gas is burned in an independent burning device whose waste heat is fed at least partially to the exhaust system and especially to the exhaust gas catalyzer provided therein.

5. The motor vehicle of claim 1, wherein the boil-off gas in the unburned or burned condition is introduced into the internal combustion engine's exhaust system upstream from the exhaust gas catalyzer or into same.

6. The motor vehicle of claim 1, wherein the boil-off gas is burned in an independent burning device whose waste heat is fed at least partially to the exhaust system and especially to the exhaust gas catalyzer provided therein.

7. A motor vehicle with a cryotank for supplying an internal combustion engine, comprising an exhaust gas system including an exhaust gas catalyzer, a device for the combustion of boil-off gas from the cryotank, a gas duct, and a nozzle of an ejector pump, wherein the nozzle is configured to introduce the boil-off gas into the gas duct which draws at least one of environmental air and scavenging air from a fuel supply system, and wherein the gas duct discharges near the exhaust gas catalyzer into the exhaust gas system.

8. The motor vehicle of claim 7, wherein the gas duct discharges into the exhaust system such that during the operation of the internal combustion engine gases are drawn from the gas duct into the exhaust gas system.

9. The motor vehicle of claim 8, wherein the boil-off gas in a unburned or burned condition is introduced into the exhaust gas system upstream either from the exhaust gas catalyzer or into the exhaust gas catalyzer.

10. The motor vehicle of claim 8, further comprising an independent burning device, wherein the boil-off gas is burned in the independent burning device whose waste heat is fed at least partially to the exhaust system.

11. The motor vehicle of claim 10, wherein the waste heat is fed to the exhaust gas catalyzer.

12. The motor vehicle of claim 7, wherein the boil-off gas in a unburned or burned condition is introduced into the exhaust gas system upstream either from the exhaust gas catalyzer or into the exhaust gas catalyzer.

13. The motor vehicle of claim 7, further comprising an independent burning device, wherein the boil-off gas is burned in the independent burning device whose waste heat is fed at least partially to the exhaust system.

14. The motor vehicle of claim 13, wherein the waste heat is fed to the exhaust gas catalyzer.

15. A method for making a motor vehicle with a cryotank for supplying an internal combustion engine, comprising the steps of:
    comprising using a nozzle of an ejector pump to introduce boil-off gas into a gas duct which draws at least one of environmental air and scavenging air from a fuel supply system, and
    using the gas duct to discharge near an exhaust gas catalyzer into an exhaust gas system of the internal combustion engine.

* * * * *